(No Model.) 7 Sheets—Sheet 3.

J. G. HODGSON.
CAN SOLDERING MACHINE.

No. 522,258. Patented July 3, 1894.

Witnesses:
Sew. C. Curtis
Emma Stark

Inventor:
John G. Hodgson
By Munday Evarts & Adcock
his Attorneys

THE NORRIS PETERS CO., PHOTO-LITHO., WASHINGTON, D. C.

(No Model.) 7 Sheets—Sheet 4.

J. G. HODGSON.
CAN SOLDERING MACHINE.

No. 522,258. Patented July 3, 1894.

Witnesses:
Geo. E. Curtis
Emma Stark

Inventor:
John G. Hodgson

By Munday, Evarts & Adcock
His Attorneys.

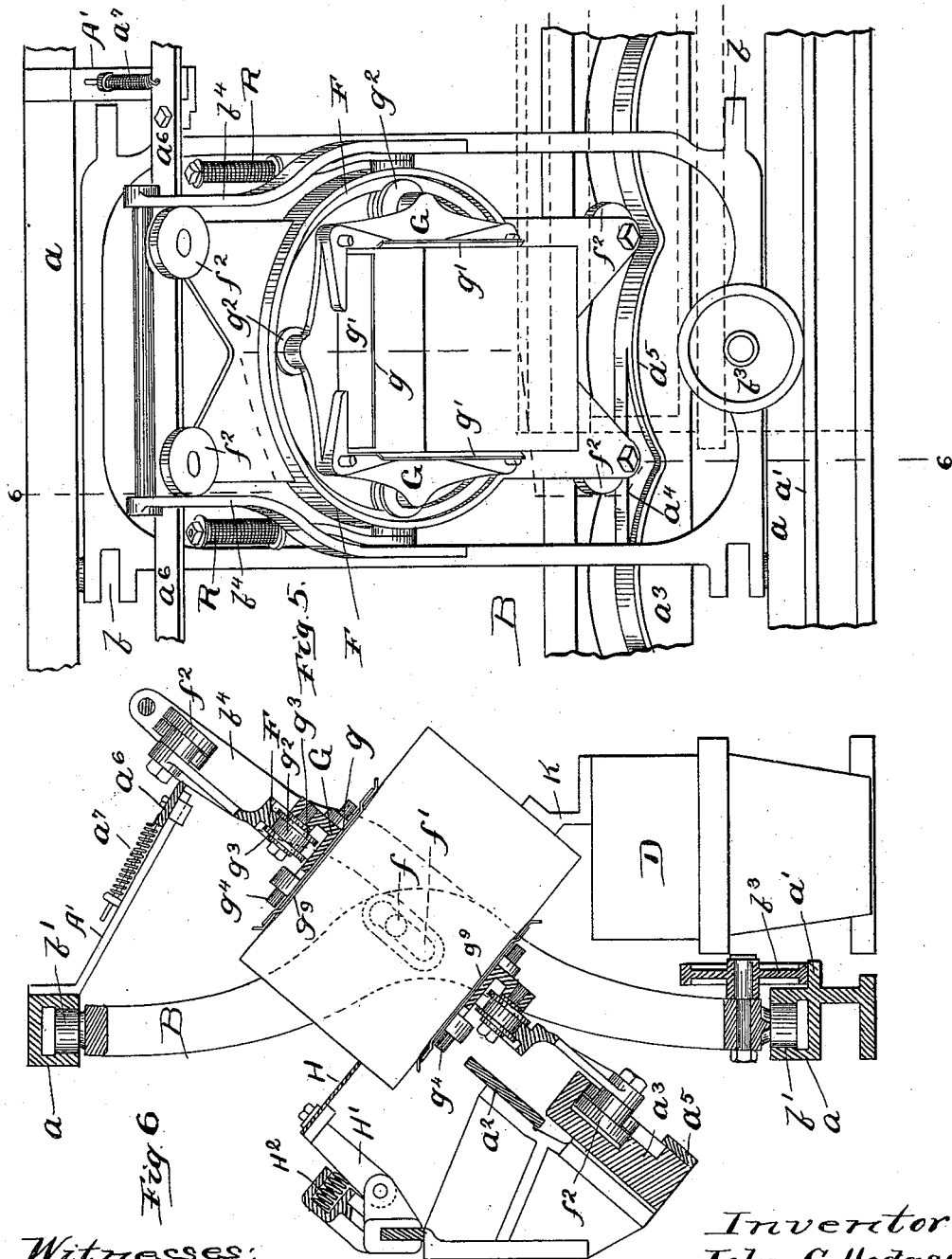

(No Model.) 7 Sheets—Sheet 6.
J. G. HODGSON.
CAN SOLDERING MACHINE.
No. 522,258. Patented July 3, 1894.
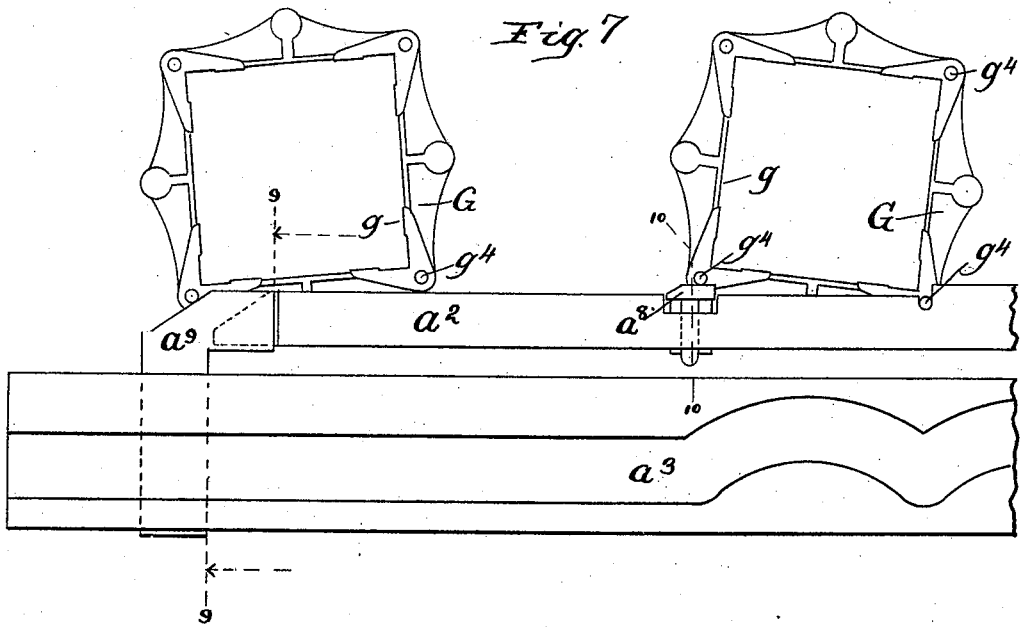
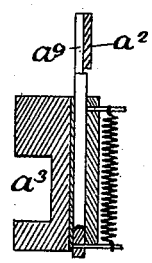
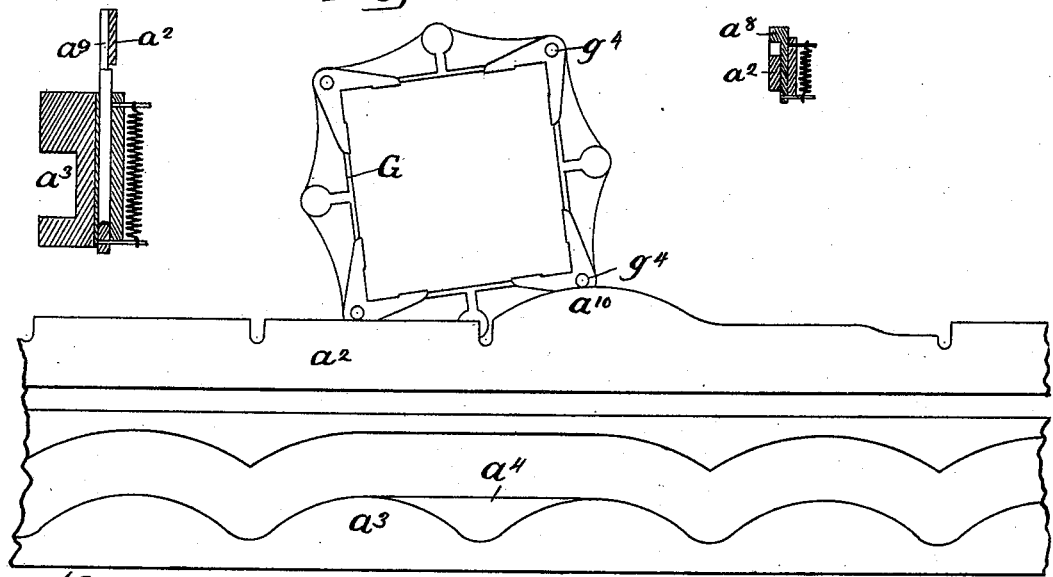
Witnesses:
Geo. E. Curtis
Emma Hark
Inventor:
John G. Hodgson
By Munday, Evarts & Adcock
his Attorneys.

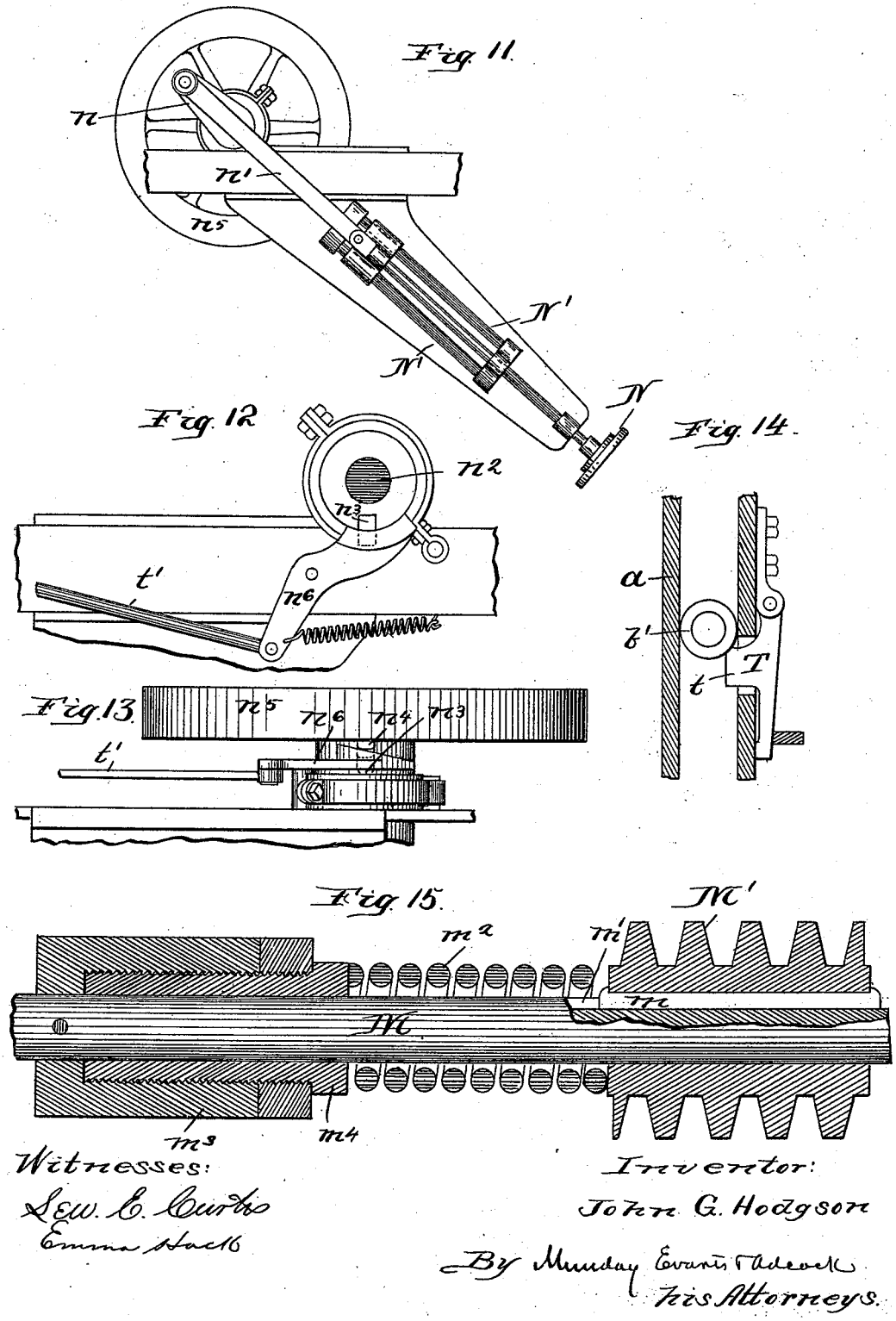

UNITED STATES PATENT OFFICE.

JOHN G. HODGSON, OF MAYWOOD, ILLINOIS, ASSIGNOR TO EDWIN NORTON, OF SAME PLACE, AND OLIVER W. NORTON, OF CHICAGO, ILLINOIS.

CAN-SOLDERING MACHINE.

SPECIFICATION forming part of Letters Patent No. 522,258, dated July 3, 1894.

Application filed October 4, 1892. Renewed March 14, 1894. Serial No. 503,559. (No model.)

*To all whom it may concern:*

Be it known that I, JOHN G. HODGSON, a citizen of the United States, residing in Maywood, in the county of Cook and State of Illinois, have invented a new and useful Improvement in Can-Soldering Machines, of which the following is a specification.

My invention relates to improvements in machines for soldering the end seams of square, rectangular or other polygonal cans having flat or irregular sides.

It relates more particularly to improvements upon the machine set forth and described in Letters Patent No. 354,731, dated December 21, 1886, wherein a polygonal shaped can is soldered by rolling its corner or end seam in a bath of molten solder.

My invention consists in the novel devices and novel combinations of parts and devices herein shown and described and more particularly pointed out in the claims.

Figure 1:
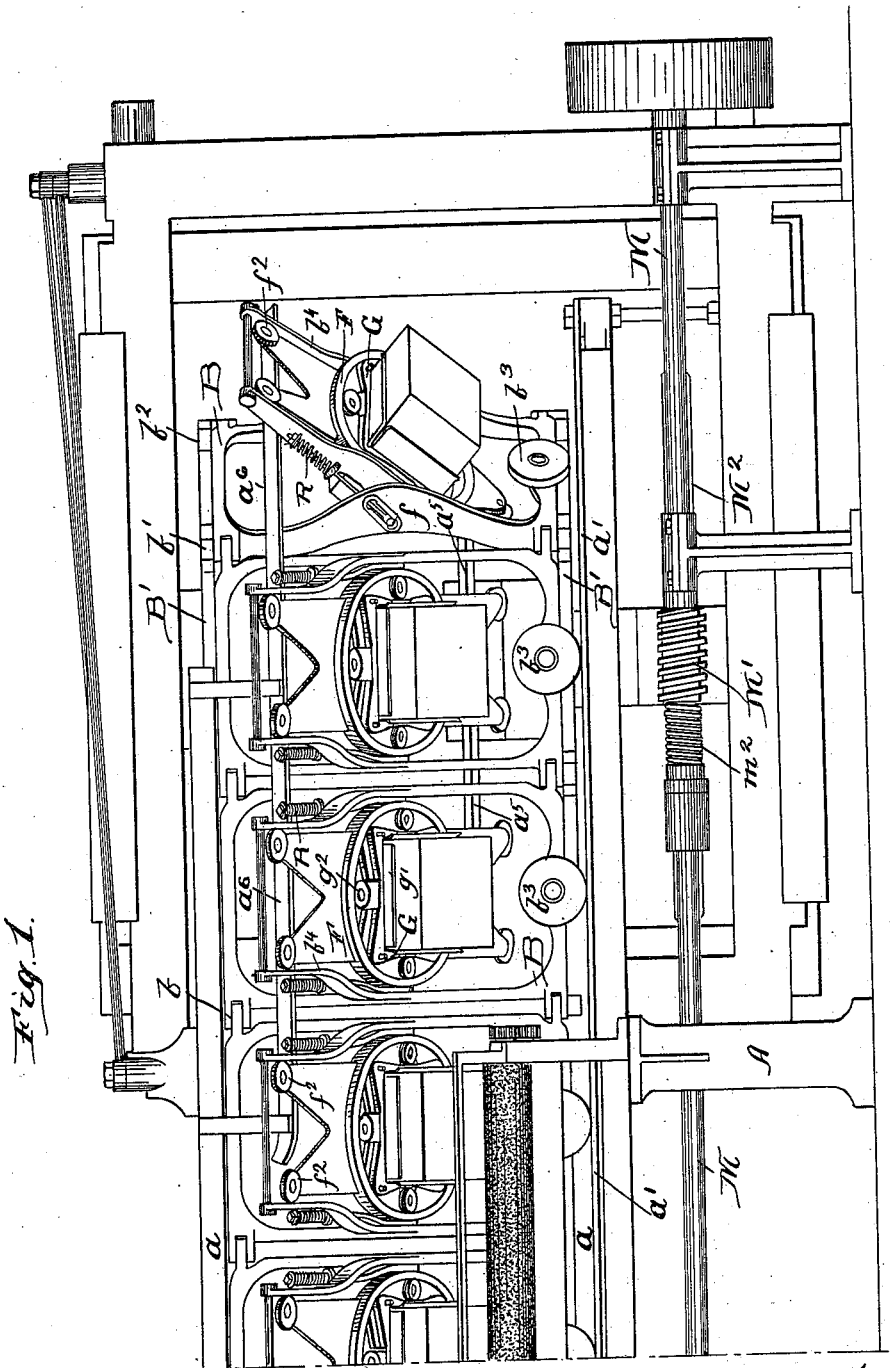
Figure 2:
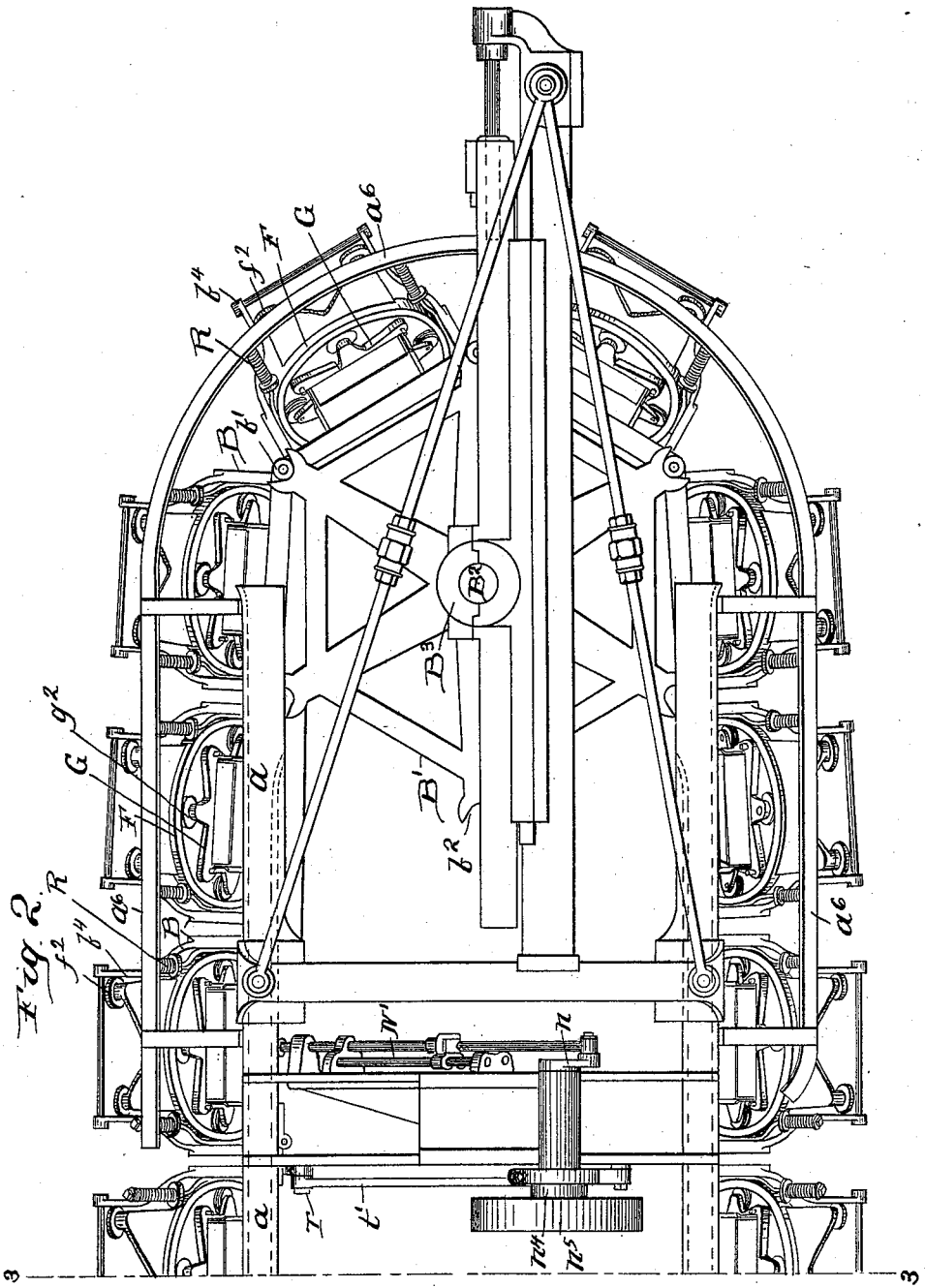
Figure 3:
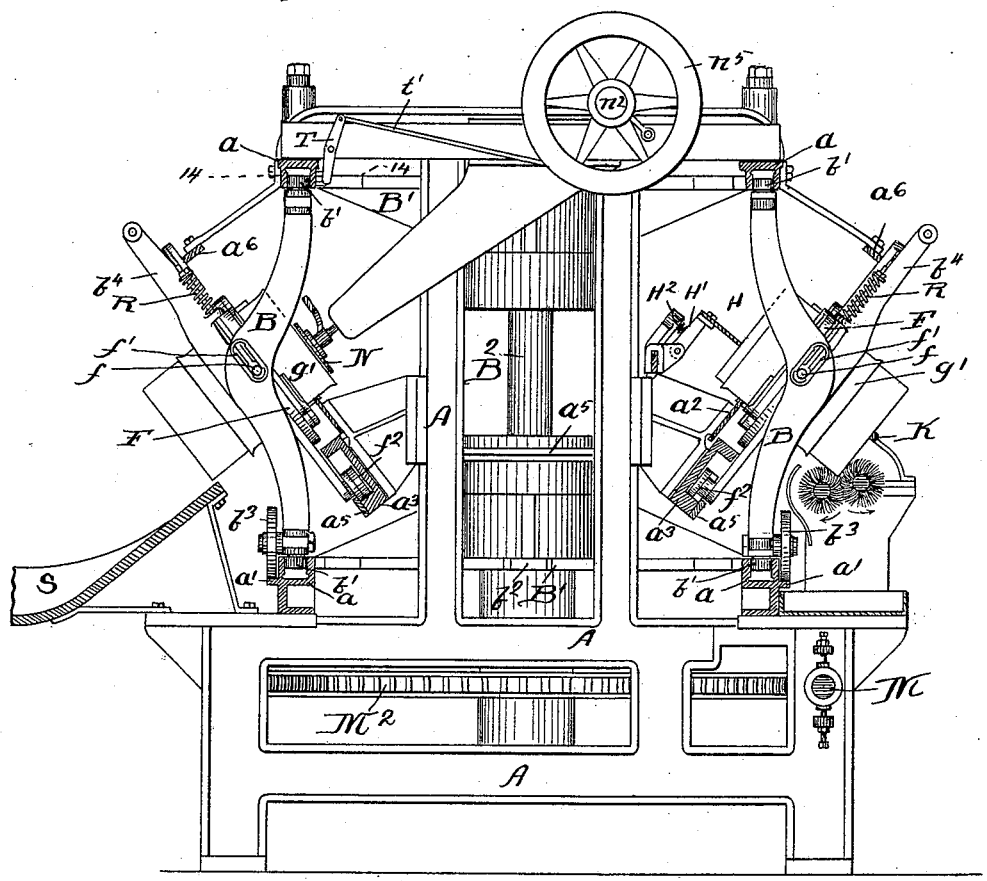
Figure 4:
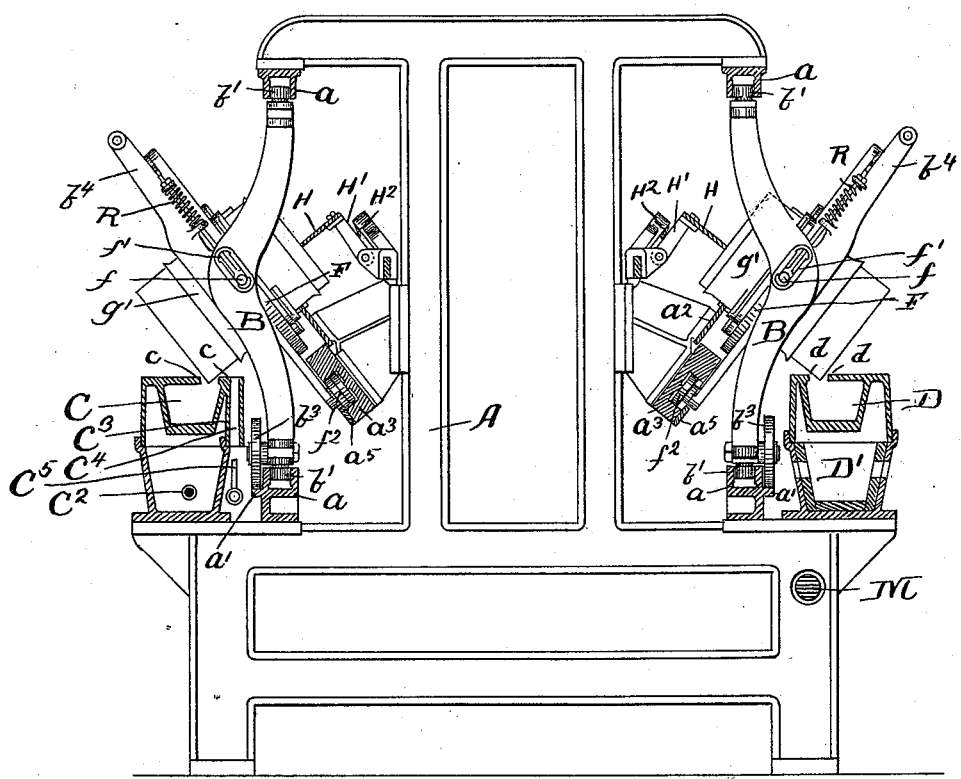

In the accompanying drawings which form a part of this specification, Figure 1 is a side elevation of a machine embodying my invention, said view showing however only a portion of the entire length of the machine, at one end. Fig. 2 is a plan view of the same. Fig. 3 is a vertical transverse section on the line 3—3 of Fig. 2. Fig. 4 is a vertical transverse section taken through the solder bath, on one side, and the acid bath on the opposite side. Fig. 5 is a detail elevation of one link of the can carrier and the can holder therein. Fig. 6 is a section taken on line 6—6 of Fig. 5. Figs. 7 and 8 are detail views of the can holders and the tracks for the same. Figs. 9 and 10 are vertical sectional views taken on lines 9—9 and 10—10 of Fig. 7. Fig. 11 is a detail side elevation of the ejector device for discharging the can from the holder after it has been soldered. Figs. 12 and 13 are detail views of the tripping mechanism for operating the ejector. Fig. 14 is a detail section of the track on line 14—14 of Fig. 3, the same showing in part the trip mechanism for operating the ejector. Fig. 15 is a detail sectional view of the worm gear mechanism for driving the can carrier chain, the same having a spring or yielding motion to compensate for the irregular strain upon the carrier by reason of the rising and falling movement of the can holder and by reason of the rolling of the flat sided or polygonal can holder along its track.

In the drawings A represents the frame of the machine.

B is the link chain can carrier, C the acid or fluxing bath, there being one upon each side of the machine, and D the molten solder vessel or bath, one being upon each side of the machine.

The link chain carrier B is composed of a series of links hinged or pivoted together at $b$. The links travel around in a vertical plane and motion is communicated to the chain by the polygonal wheels B', one at each end of the machine. The shaft $B^2$ of each of these polygonal wheels is journaled in a suitable box or bearing $B^3$ on the frame of the machine. The pivot pins or shafts $b$ by which the links B B of the chain are hinged together are furnished with friction rollers $b'$ which fit in a suitable guide, groove or track $a$ on the frame of the machine which serves to guide the chain carrier and keep it in position. The polygonal wheels B' are likewise furnished with notches or sockets $b^2$ to receive or engage these anti-friction rollers $b'$. The link chain carrier B is supported by and travels around upon a track $a'$ upon the frame of the machine. The carrier is furnished with a series of wheels $b^3$ which roll upon the track $a'$, each link of the chain having preferably one of these wheels.

The acid or flux bath C has a heating chamber surrounding it upon all sides except the top, the same being furnished with a steam coil or other heating device $C^2$ by means of which the acid or flux may be kept hot. The inner wall $C^3$ of this heating chamber is also provided with a flue or gas chamber $C^4$ for heating the same and directing the heat and flame of the gas burner $C^5$ up against the can so as to heat the seam of the can.

The solder bath D has a furnace or heating chamber D' surrounding it.

F is the swiveling or pivotal ring of the revolving can holder G and in which said can holder revolves. The swiveling ring F has pivot pins $f$ which fit in slots $f'$ $f'$ formed in the links B of the carrier so that this swiveling ring F may have the necessary up and down reciprocating movement to permit the polygonal can to roll along the guides $c$ $c$ of the acid bath and guides $d$ $d$ of the solder bath. The revolving can holder G, one in each link of the carrier is furnished with a socket $g$ conforming in shape or outline to the cross section of the can which is to be placed therein. This socket is preferably formed of plates $g'$ one for each side of the can.

The revolving can holder G is furnished with a number of anti-friction rollers $g^2$ having flanges $g^3$ so that the same may freely revolve in the pivotal ring F. The revolving can holder ring G is furnished with pins or projections $g^4$ which engage a notched track or rack $a^2$ on the frame of the machine, which thus causes the can holder ring G and the can therein to have a rolling movement.

The swiveling ring F is furnished with wheels or rollers $f^2$, preferably two at each end, which ride upon a curved or waved track $a^3$ on the frame of the machine so as to communicate the requisite up and down or reciprocating movement to the holder G and the can therein to correspond to the up and down movement of the axis of the can as the flat sided can turns upon its corners in rolling along. The wheels or rollers $f^2$ are provided at each end of the pivotal ring or plate F as the ring or plate turns end for end to present the opposite end of the can to the second flux and solder baths after the first end of the can has been soldered by the first set of flux and solder baths in the machine.

To cause the can holder and the can therein to be properly raised into the bath and out of the same, the track $a^3$ upon which the reciprocating and pivotal ring or plate F travels is provided at the entrance and exit ends of the bath with a straight portion $a^4$ upon which the last one of the two wheels $f^2$ may ride, the two wheels being offset or set out of line with each other so that only the last wheel will engage this duplicate raised portion of the track.

The machine which I have shown in the drawings is specially designed for soldering the end seams of large square cans commonly known as "petroleum cans." And to keep the pivotal rings or plates F straight and in proper position in the slotted links B of the chain carrier and to prevent any tendency of the same to bind due to their weight or dragging strain, I provide each link B with brackets or arms $b^4$ which are adapted to engage the upper pair of wheels $f^2$ on the rings or plates F, and thus serve to hold the same in proper position and thereby cause said rings or plates F to move up and down in the slotted rings B freely. The pivoted rings or plates F are swiveled or turned on their pivots and guided or held at the requisite inclination as they travel along by means of a track or guide $a^5$ on the frame of the machine. A further guide or track $a^6$ engaging the upper end of the pivotal plates or rings F serves to keep the wheels $f^2$ in proper contact with their track $a^3$. This guide $a^6$ is connected yieldingly by springs $a^7$ with the supporting brackets A' attached to the frame of the machine. As the cans travel along the flux and solder baths C D they are guided and supported by the guides $c$ $c$ and $d$ $d$ of said baths so that the seam is properly presented to the surface of the flux and solder in the baths or vessels C D. The cans are further guided by a yielding guide H which presses against the upper ends of the cans. This guide or bar H is given the requisite spring or yielding movement by means of a pivoted supporting arm H' held in position by a spring $H^2$. Between the solder and flux baths and before and after the same, as well as along the same, the lower ends of the cans in the holders G fit against a guide K which serves to hold them in position.

By reason of the yielding movement of the guide H the can is permitted to have the requisite rising and falling movement necessary to have it roll or turn on its corners without causing it to bind between this guide H and the lower guide.

The notched track or rack $a^2$ is furnished with a spring or elastic section $a^8$ which serves to give the holder G a slight tilt to insure the pins $g^4$ engaging the first notch of this notched track. This is clearly illustrated in Fig. 7. This track is likewise furnished with another yielding section $a^9$ at its beginning to prevent any concussion or blow when the pins come in contact with the track at the point where the track $a^3$, upon which the rings F ride, is provided with the duplicate raised portion $a^4$. This notched track is furnished with a raised curved portion $a^{10}$ to compensate for the tilted position the can is given by reason of this straight or raised portion $a^4$ of the track $a^3$. This will be clearly understood by reference to Figs. 5 and 8.

M is the main driving shaft of the machine and from which motion is communicated to the vertical shafts $B^2$ of the polygonal wheels B by means of the worm M' which meshes with a worm gear $M^2$ on said shaft $B^2$. In order to drive the carrier B without any jerky motion or strain which would naturally result from the rolling of the polygonal cans and their holders along the tracks, the worm M' is splined to the shaft M, the spline and groove being indicated at $m$ and $m'$, so that this worm may have a sliding movement on said shaft; and the shaft is further provided with a spring $m^2$ to back up or hold in position yieldingly said worm. The spring $m^2$ abuts against a stop $m^3$ fixed to the shaft and which is provided with an adjusting nut $m^4$ whereby the tension of the backing spring $m^2$ may be regulated as desired. By means of this yielding or spring held worm on the driving shaft combined with the can carrier and its polygonal or flat sided can holders, I am enabled to roll the cans through the bath of flux and solder steadily and smoothly without any jerking or jarring motions which would tend to destroy or injure the machine, and which at the same time would prevent the proper soldering of the cans.

To properly solder the cans by a rolling movement through the solder bath, it is very desirable that the cans should not be subjected to jarring movements tending to disturb the solder in the seams before it becomes properly set.

N is the ejector by which the soldered cans are pushed endwise out of the socket of the holder G. This ejector has a reciprocating movement in suitable guides N' on the frame of the machine, the same being actuated by a crank $n$ and connecting link or pitman $n'$. The crank $n$ is on a shaft $n^2$ and motion is communicated to this shaft at suitable intervals by a clutch $n^3\, n^4$, one part of which clutch revolves with the band wheel $n^5$. The movable part of the clutch $n^4$ is operated at intervals by a lever T having a projection $t$ which is engaged by the carrier chain B or its friction roller $b'$ and which is connected to the clutch arm $n^6$ by the connecting rod $t'$.

In order to cause the machine to run smoothly and easily I counteract in part the weight of the can holders G and their pivotal rings or plates F and of the cans in the holders by means of counterbalance springs R attached at one end to the links B of the carrier chain and at their opposite ends to the pivots of the rings or plates F of the can holders.

Opposite the ejector N I provide the machine with a discharge chute or device S to receive the can as it is discharged from the holder of the can carrier. The chute S is attached to the frame of the machine. By means of this chute combined with the ejector the cans are automatically delivered from the machine. The ejector makes a quick stroke and thus serves to push the cans out of the holder while the can carrier moves continuously along.

It will be observed that the can holder in my machine has the same revolving motion on its own axis combined with an up and down bodily reciprocating movement to enable the flat sided can to roll or turn on its corners as in the machine of said Patent No. 354,731, referred to.

The spring held sliding worm on the driving shaft combined with the can carrier and its angular or flat sided can holders enables me to regulate the tension of the spring to accomplish the important result in the practical operation of soldering these flat sided cans of giving a momentary pause of each straight seam or side of the can in the solder or flux bath, thus increasing the length of time it is in contact with the solder or acid. In soldering angular or flat sided cans by rolling them through a bath, but for this pause or somewhat intermittent revolving movement given to the can, the entire length of each seam of the can would be raised out of contact with the molten solder at almost the instant it touched the same and much too quick to enable the solder to properly sweat through or penetrate the folds of the seam. By means of this sliding spring held worm on the driving shaft in connection with the carrier and its can holders I am also enabled, at will, to give an intermittent motion to the carrier or a continuous motion thereto by simply regulating the tension of the spring $m^2$. It will also be readily understood by those skilled in the art that by means of this spring held worm on the driving shaft I am enabled to produce this pause in the rolling movement of the can holders while the flat side or seam is down without diminishing the speed or capacity of the machine from what it would be if the carrier moved steadily and continuously because the spring by its subsequent expansion gives a quicker movement to the carrier and to the rolling of the can holder at the time the strain or force required is less, that is to say while the holder is turning downward on its corners or while the can holder ring or plate F is moving on the descending side of the curves of the track $a^3$.

To enable the cans to be readily and quickly inserted in the sockets $g$ of the holders G and removed therefrom and at the same time to cause the cans to be securely held in the holders I provide the sockets of the holders with flat springs $g^9$ which press against the sides of the can.

I claim—

1. In a machine for soldering angular or flat sided cans the combination with a solder bath of a can carrier furnished with a series of revolving up and down bodily reciprocating can holders mounted on said carrier for rolling the cans along said bath and a driving shaft for communicating motion to said carrier furnished with a sliding worm, and means for holding it yieldingly in position so that the yielding or sliding movement of the worm on its shaft may compensate for the irregular strain upon the carrier, substantially as specified.

2. The combination in a soldering machine of a link chain can carrier furnished with a series of can holders, polygonal wheels for driving said carrier and a driving shaft furnished with a worm splined thereto and a spring for holding said worm yieldingly in position, the shaft of said polygonal wheel being geared or connected to said worm and driven thereby, substantially as specified.

3. The combination in a soldering machine of a link chain can carrier furnished with a series of can holders, polygonal wheels for driving said carrier and a driving shaft furnished with a worm splined thereto and a spring for holding said worm yieldingly in position, the shaft of said polygonal wheels being geared or connected to said worm and driven thereby, said driving shaft having fixed thereon a stop provided with an adjustable nut for said spring to abut against, substantially as specified.

4. In a soldering machine the combination of the solder bath with an endless link chain carrier B furnished with a series of can holders and provided with a series of supporting wheels $b^3$ journaled on said carrier B upon which said carrier travels and a track $a'$ for said carrier wheels to run upon, substantially as specified.

5. In a machine for soldering angular or flat sided cans, the combination with a solder bath of an endless link chain carrier B having a series of revolving pivotal up and down reciprocating can holders mounted on said carrier for rolling the cans along said bath, and a track $a'$ for said carrier, the links of said carrier being furnished with a series of upright wheels for supporting said carrier on said track, substantially as specified.

6. The combination in a soldering machine of a link chain carrier B, horizontal polygonal wheels B′ for driving said carrier, the track $a'$ upon which said carrier travels and upright supporting wheels $b^3$ on said carrier adapted to roll upon said track, substantially as specified.

7. In a machine for soldering angular or flat sided cans, the combination of a solder bath with a can carrier having a series of revolving pivotal up and down reciprocating can holders mounted on said carrier for rolling the cans through said bath and a curved or waved track $a^3$ engaging said can holders for giving them their up and down bodily reciprocating movement, said track $a^3$ having a supplemental straight portion $a^4$ for raising the can into and out the solder bath, substantially as specified.

8. In a machine for soldering angular or flat sided cans, the combination of a solder bath with a can carrier having a series of revolving pivotal up and down reciprocating can holders mounted on said carrier for rolling the cans through said bath and a curved or waved track $a$ engaging said can holders for giving them their up and down bodily reciprocating movement, said track $a$ having a supplemental straight portion $a^4$ for raising the can into and out the solder bath, said can holders having an up and down reciprocating ring or plate F furnished with wheels or rollers $f^2$ $f^2$ adapted to engage said track, said wheels or rollers being set out of line with each other so that one of said rollers may follow the curve of said track $a^3$ while the other follows the straight portion $a^4$ thereof, substantially as specified.

9. In a soldering machine the combination with a solder bath of a can carrier furnished with a series of revolving can holders and a spring pressure guide or bar H for engaging the upper end of the can to adapt the can to revolve under the pressure bar, substantially as specified.

10. In a soldering machine the combination with the solder bath of a can carrier furnished with a series of revolving pivotal up and down reciprocating can holders of a spring pressure guide or bar H engaging the upper end of the can and holding it in position while it is rolled along by the carrier, substantially as specified.

11. In a machine for soldering angular or flat sided cans the combination with a solder bath of a can carrier having a series of up and down reciprocating can holders furnished with counterbalance springs and means for imparting an up and down reciprocating movement to said can holders, substantially as specified.

12. The combination with a solder bath of a can carrier furnished with a revolving up and down reciprocating can holder of a counterbalance spring for said holder, means for imparting a rolling or revolving movement to said can holder, and means for imparting an up and down reciprocating movement to said can holder, substantially as specified.

13. The combination with a can carrier B having a series of revolving can holders furnished with pins or projections $g^4$ $g^4$ and a notched track or rack for engaging said pins and causing the can holders to revolve, said track being furnished with a spring supported section $a^8$ to cause the holder to tilt and insure its proper engagement with the notches of said track or rack, substantially as specified.

14. The combination with a can carrier B furnished with a series of revolving can holders provided with pins or projections to engage the track of a track or rack $a^2$ provided with a yielding or spring section at its end to cushion the holder against the track as it meets or leaves the same, substantially as specified.

15. In a soldering machine the combination with the can carrier furnished with pivotal up and down reciprocating can holder rings or plates F and revolving can holders G mounted in said rings or plates F and a track $a^3$ to guide said rings or plates F and a spring pressure guide or bar $a^6$ for engaging the upper end of said rings or plates F to hold the same in position, substantially as specified.

16. In a can soldering machine the combination with a carrier furnished with a series of revolving pivotal up and down reciprocating can holders of an ejector device mounted upon the frame of the machine for pushing the cans out of their holders as the carrier brings the holders in turn opposite said ejector device, substantially as specified.

17. In a can soldering machine the combination with a carrier furnished with a series of revolving pivotal up and down reciprocating can holders of an ejector device for pushing the cans out of their holders as the carrier brings the holders in turn opposite said ejector device, and a discharge chute or device for receiving the cans as they are pushed out of the holders by the ejector, substantially as specified.

18. In a can soldering machine the combination with a carrier furnished with a series of pivotal revolving up and down reciprocating can holders of an ejector device for pushing the cans out of their holders, and mechanism for reciprocating said ejector furnished with a clutch, and a lever for operating the clutch projecting in the path of the carrier and operated thereby, substantially as specified.

19. The combination of link chain can carrier B, the links whereof have slots $f'$, of pivotal up and down reciprocating rings or plates F and revolving can holders G mounted in said rings or plates F, the links of the carrier being provided with brackets or arms $b^4$ adapted to engage the upper ends of the rings or plates and hold them in position, substantially as specified.

20. The combination of link chain carrier B, the links whereof have slots $f'$, of pivotal up and down reciprocating rings or plates F, and revolving can holders G mounted in said rings or plates F, the links of the carrier being provided with brackets or arms $b^4$ adapted to engage the upper ends of the rings or plates and hold them in position, said rings or plates F having wheels or rollers $f^2$, substantially as specified.

21. The combination of a can carrier furnished with a series of can holders having sockets to receive the cans, of a reciprocating ejector N mounted upon the frame of the machine for pushing the cans out of said sockets in turn as they are brought around opposite said ejector by the carrier, substantially as specified.

22. The combination of a can carrier furnished with a series of can holders having sockets to receive the cans of a reciprocating ejector N mounted upon the frame of the machine for pushing the cans out of said sockets in turn as they are brought around opposite said ejector by the carrier and a discharge chute S, substantially as specified.

23. The combination of a can carrier furnished with a series of can holders having sockets to receive the cans, of a reciprocating ejector N for pushing the cans out of said sockets, a revolving crank for operating said ejector, a clutch and a clutch operating lever projecting in the path of said carrier and operated thereby, substantially as specified.

24. In a can soldering machine the combination with a can carrier furnished with a series of angular or flat sided rolling can holders, of a driving shaft for communicating motion to said holders furnished with a yielding sliding worm to cause the carrier to give a pause to the rolling can while its seam is in contact with the solder, substantially as specified.

25. In a can soldering machine the combination with a can carrier furnished with a series of angular or flat sided rolling can holders of a driving shaft for communicating motion to said holders furnished with a yielding sliding worm to cause the carrier to give a pause to the rolling can while its seam is in contact with the holder, and a backing spring for holding said worm yieldingly in position, substantially as specified.

JOHN G. HODGSON.

Witnesses:
LEW. E. CURTIS,
EMMA HACK.